United States Patent [19]

Tchernev

[11] Patent Number: 5,089,159

[45] Date of Patent: Feb. 18, 1992

[54] MAGNETIC SUBSTANCE HAVING SHARP PERMEABILITY TRANSITION TEMPERATURE, PROCESS FOR MAKING, AND APPARATUS

[76] Inventor: Dimiter I. Tchernev, 3905 Sierra Dr., Austin, Tex. 78731

[21] Appl. No.: 266,231

[22] Filed: Oct. 28, 1988

Related U.S. Application Data

[60] Continuation of Ser. No. 684,870, Dec. 21, 1984, abandoned, which is a division of Ser. No. 161,689, Jun. 23, 1990, Pat. No. 4,490,268, which is a division of Ser. No. 881,592, Feb. 27, 1978, Pat. No. 4,208,911, which is a continuation of Ser. No. 781,952, Mar. 28, 1977, abandoned, which is a continuation of Ser. No. 293,596, Sep. 29, 1972, abandoned.

[51] Int. Cl.$^5$ ............................................. C04B 35/26
[52] U.S. Cl. ............................... 252/62.62; 252/62.56; 252/62.57; 252/62.59; 252/6.6; 252/62.61; 148/100
[58] Field of Search ............... 252/62.62, 62.56, 62.57, 252/62.59, 62.60, 62.61; 148/100

[56] References Cited

U.S. PATENT DOCUMENTS

| | | | |
|---|---|---|---|
| 2,579,978 | 12/1951 | Snoek et al. | 252/62.62 |
| 3,002,930 | 10/1961 | Robinson et al. | 252/62.62 |
| 3,509,058 | 4/1970 | Estival et al. | 252/62.62 |
| 3,532,630 | 10/1970 | Tenzer | 252/62.62 |
| 3,573,208 | 3/1971 | Brockman et al. | 252/62.62 |
| 3,574,116 | 4/1971 | Sugano et al. | 252/62.62 |

FOREIGN PATENT DOCUMENTS 1283872  5/1962  France ............................ 252/62.62

*Primary Examiner*—John P. Sheehan
*Attorney, Agent, or Firm*—Penrose Lucas Albright

[57] ABSTRACT

A magnetic mateial which includes an impurity metal of relatively large atomic diameter such as zinc, titanium, zirconium, yttrium, or cadmium introduced uniformly therein in amount sufficient to distort its crystaline structure to alter its anisotrophy so that the permeability of the substance remains substantially constant with changes in temperature up to the permeability transition temperature and; there being also introduced uniformly therein further metallic atoms which achieve a desired transition temperature within an accuracy of at least 0.1° C. such material being utilized in an apparatus adapted to be interrogated to disclose whether its temperature is above or below the transition temperature within at least 0.1° C., the signal propagating properties of the material altering drastically at such temperature, the material having an output which is inherently digital and directly compatible with digital information processing and control without A/D conversion.

11 Claims, 3 Drawing Sheets

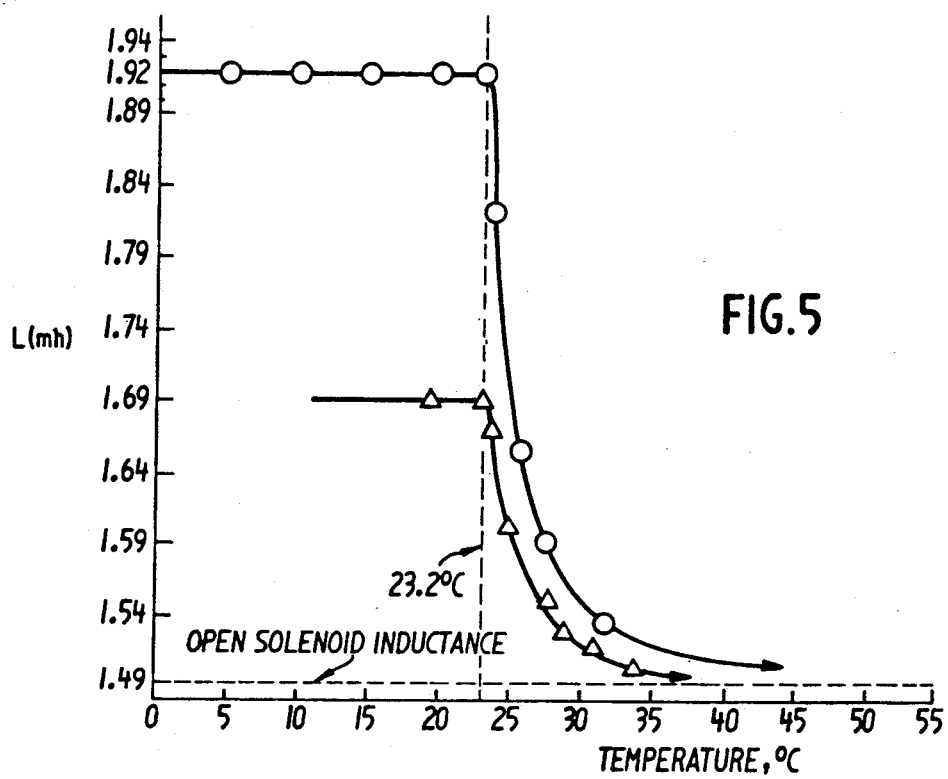
FIG.5
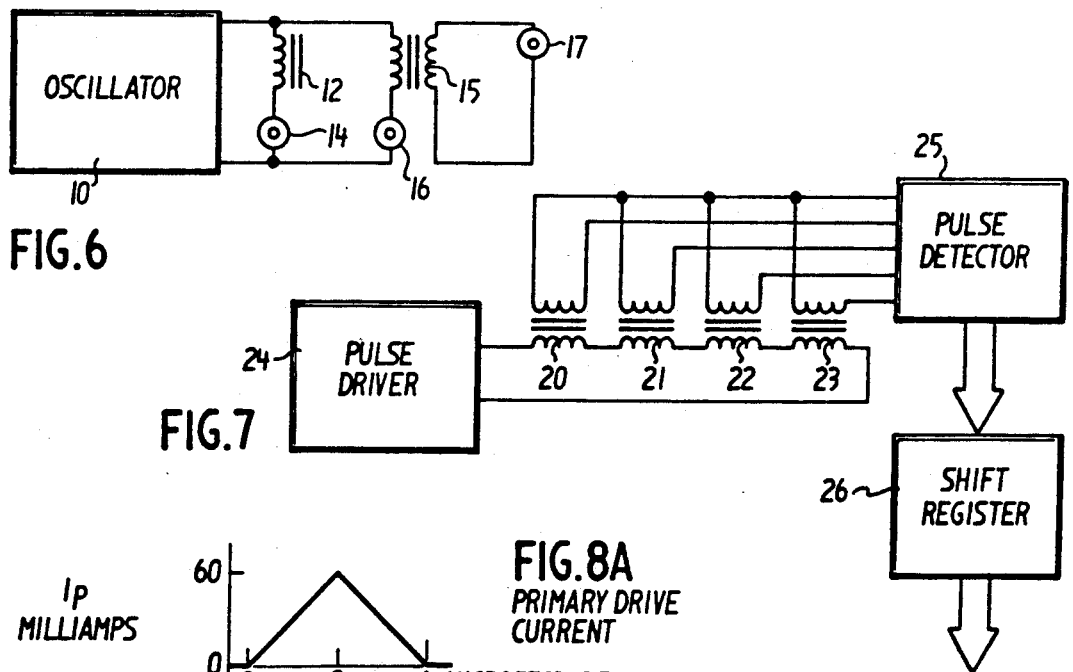
FIG.6
FIG.7
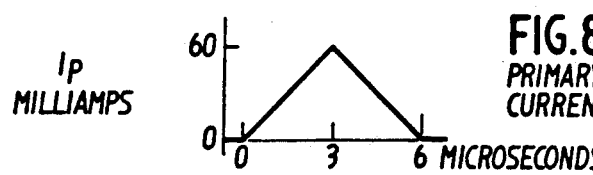
FIG.8A
PRIMARY DRIVE CURRENT
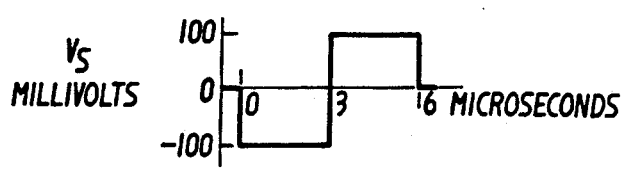
FIG.8B
SECONDARY OUTPUT VOLTAGE

MAGNETIC SUBSTANCE HAVING SHARP PERMEABILITY TRANSITION TEMPERATURE, PROCESS FOR MAKING, AND APPARATUS

This is a continuation of application Ser. No. 684,870, filed Dec. 21, 1984, now abandoned, which is a division of application Ser. No. 161,689, filed June 23, 1980, now U.S. Pat. No. 4,490,268 of Dec. 25, 1984, which is a division of application Ser. No. 881,592 filed Feb. 27, 1978, now U.S. Pat. No. 4,208,911, of June 24, 1980, which is a continuation of application Ser. No. 781,952 filed Mar. 28, 1977, now abandoned, which is a continuation of application Ser. No. 293,596, filed Sept. 29, 1972 now abandoned.

The invention involves a magnetic structure which abruptly changes at its critical temperature (Curie temperature) from a magnetic to a non-magnetic state and which can be interrogated and its state determined by approximate external circuitry. More particularly, the invention pertains to the method of achieving the desired abrupt change at a preselected critical temperature and the utilization of this phenomenon in a non-saturated linear signal propagating apparatus wherein the signal propagating properties of the material are altered sharply after a critical temperature change of less than 0.1° C.

Magnetic materials such as spinel ferrites are well known in the art and have a physical characteristic of a critical temperature known as the Curie temperature at which they lose their magnetic properties. Also, it is generally well known that some properties such as magnetization change gradually with temperature changes whereas other characteristics such as the initial susceptibility may disappear abruptly at the critical temperature. With magnetic devices wherein the initial susceptibility (or permeability) of the magnetic material is important, their performance is generally required to be independent of temperature and; therefore they operate at a temperature well below the critical temperature. Such devices include inductors, transformers and the like.

It is not uncommon to measure or to utilize the change in magnetization which changes with temperature to determine the induced voltage of a generator or temperature detector or the like and to control the output. However, such mechanisms have difficulty in that the magnetization has a slow rate of change with temperature at any given point thus creating a large area of uncertainty as to the accuracy of the temperature reading. Thus, such devices inherently have a low sensitivity to temperature changes.

It is also generally known that the critical temperature of a magnetic material is determined by its chemical and crystallographic composition. However, for many magnetic materials, this temperature varies over a relatively broad range. The difficulties associated with the preparation of a material of precisely known composition has heretofore limited control of the critical temperature to a range of several degrees. Thus, before the instant invention it has not been possible to produce a magnetic substance having a predetermined critical temperature except within a relatively broad range of say plus or minus 2° C.

SUMMARY OF THE INVENTION

The instant invention is a new method to achieve a preselected transition temperature within an accuracy of 0.1° C. or better through modification of the chemical and crystallographic composition of known compositions for magnetic materials, particularly spinel ferrites. It has thus been discovered that through the careful control of the chemical composition and thermal treatment of a modified spinel ferrite composition the initial permeability of same may be made independent of temperature up to a critical point where, at such temperature, the permeability changes abruptly and drastically. In this connection, the initial permeability of most magnetic materials is proportional to the radio of magnetostatic and anisotropic energies. Although very little control is possible over the magnetostatic energy, the anisotropic energy may be altered by changing the impurity and imperfection content of the magnetic material. It has been discovered that by careful control of said impurities and imperfections, the anisotropic energy may be made to have the same dependence on temperature as the magnetostatic energy. In this way, the ratios of said energies and therefore the initial permeability remains independent of the temperature until the critical point is reached whereupon the material becomes essentially non-magnetic. In the instant invention, the temperature behavior of the permeability of a magnetic material such as a spinel ferrite is controlled by the adding an impurity to such a substance in an amount sufficient to distort its crystalline lattice and thus increase the anisotropy of the crystalline matrix of a spinel ferrite whereby its permeability becomes substantially constant relative to changes in temperature up to the transition temperature. Although it is not practical at present to produce a mixture which will result in the exact desired transition temperature, it is possible to do so within a few degrees and has been found that batches from such a mixture will thereafter, as long as that particular mixture is utilized for the production of magnetic material in accordance with the invention, give a constant known transition temperature.

To obtain the desired accuracy, a further modification to the chemical and crystallographic structure of the modified spinel ferrite is required. It has been discovered that this can be obtained through a doping process comprising a fluid diffusion of a predetermined amount of transition metal ions into the modified composition. In this connection, it has been observed that many metallic compounds may be prepared in solutions of desired small concentration. By using such a solution to wet the starting material powder of a given composition, the solvent may be subsequently evaporated and a uniform distribution of metallic molecules results in the starting material. By thereafter heating the preparation thus produced to facilitate solid state diffusion and formation of the desired magnetic compound, the organo-metallic molecules decompose and the metallic ions remain in the solid compound—the organic gases diffusing into the atmosphere. Thus, a process is provided where the chemical composition of the magnetic compound is altered as desired by varying the strength of the solution for the liquid doping of the starting materials with ions to attain the desired critical temperature. By appropriately diluting such solution of metallic compounds with solvent, any desired degree of concentration may be obtained and a very sensitive method is provided selectively to change the composition of the magnetic materials to within a few parts per million. This discovery has made it possible to control the critical temperature of magnetic materials to within better than 0.1° C.

The general formula for a spinel ferrite in accordance with the invention is $R_{(1-x)}T_xFe_2O_4$. "R" is a metal of the iron group, atomic number 22-30, the palladium group, atomic numbers 40-48, the platinum group, atomic numbers 72-80, or lithium. "T" is a non-magnetic metal of a group which includes zinc, titanium, zirconium, cadmium, yttrium or any R element. In order to provide temperature independence up to the critical temperature of the substance, a further amount of "T" is added whereby the chemical formula for the substance becomes $R_{1-x)}T_{x/a} FE_2O_4$ where "a" is a number from 0.05 to 0.2 as necessary to provide a substantially constant permeability of the material relative to temperature up to the transition temperatures. "T", although preferably a single metal from the group set forth above is used, also may be a mixture of said metals as desired.

When a further metal is diffused in the mixture set forth above to obtain the exact temperature, the formula becomes $R_{(-x-b)}T_{x-a}Fe_2O_4$ where "b" is a number in the range $10^{-1}$ to $10^{-6}$ and R may be either a single metal or a mixture of metals in the R group as set forth above as determined to give a transition temperature which is desired.

With the transition temperature being accurately controlled by the composition and structure of the magnetic material, the initial permeability of such material may be employed in signal propagating structure or link in communication between a signal producing apparatus and responsive means with the propagating properties of the structure or link being drastically and discontinuously altered at the critical temperature. Thus, a temperature measuring device is provided having extremely high stability and accuracy which utilizes the abrupt changes in the magnetic properties of the magnetic substance at the critical temperature. This may be obtained through the coils of a transformer which utilizes the magnetic substance as a core. With such apparatus, a change in temperature at the critical point alters the permeability of the material and therefore changes the mutual inductance and/or coupling coefficient between the coils of the transformer. In a preferred embodiment of the invention, the signal propagating structure is a toroidal transformer with the magnetic material of the invention used as a core for both the primary and secondary coils. Preferably the input signal of the primary coil is a current ramp having a constant slope and maximum value not to exceed the saturation drive of the magnetic material. Due to the natural differentiating properties of magnetic induction, the induced output voltage of the secondary coil is a square wave of constant amplitude. A change in temperature from below to above the critical transition temperature abruptly changes the amplitude of the output voltage to near zero which is detected and responded to by electronic circuitry external to such structure.

Other adaptabilities and capabilities of the invention will be apparent to those skilled in the art from the following description taken in conjunction with the following drawings:

BRIEF DESCRIPTION OF THE DRAWINGS

FIG. 5 is a graph illustrating the abrupt permeability versus temperature curves for manganese germanium magnetic materials;

FIG. 6 is a schematic diagram of a magnetic on-off switch which illustrates a use of the invention;

FIG. 7 is a further schematic diagram which illustrates another use of the invention in the form of a digital magnetic temperature transducer; and FIGS. 8A and 8B are a diagrammatic representation of forms of drive current and output voltage which may be advantageously utilized for the apparatus shown in FIG. 7.

BRIEF DESCRIPTION OF THE PREFERRED EMBODIMENTS

The practical application of the invention comprises a signal propagating apparatus which contains a magnetic structure having the composition of the invention for the transmission of a time-varying signal such as, for example, a square wave signal. If the frequency of the signal is below 100 MHz, the apparatus may be constructed of discrete elements with the magnetic structure being of the closed-flux type inductors or transformers. However, at higher frequency, the apparatus is of wave guide construction with magnetic material, in accordance with the invention, incorporated in the proper geometry. The material which, in accordance with the invention, is utilized for the magnetic structure has a critical temperature dependent upon its chemical and crystallographic composition.

Figure 1:
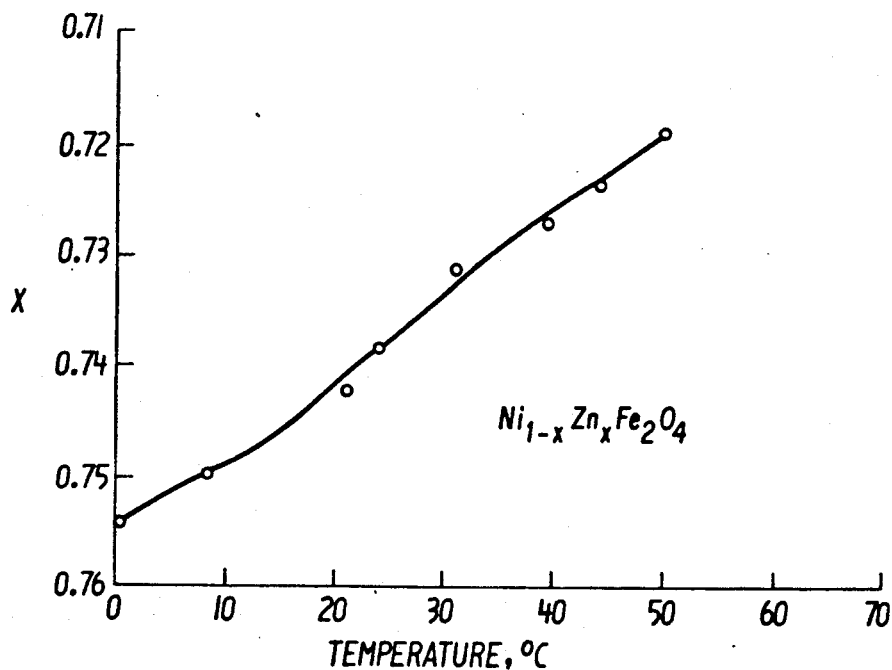
FIG. 1 is a graph of critical temperature as a function of composition for nickel-zinc ferrite.
Figure 2:
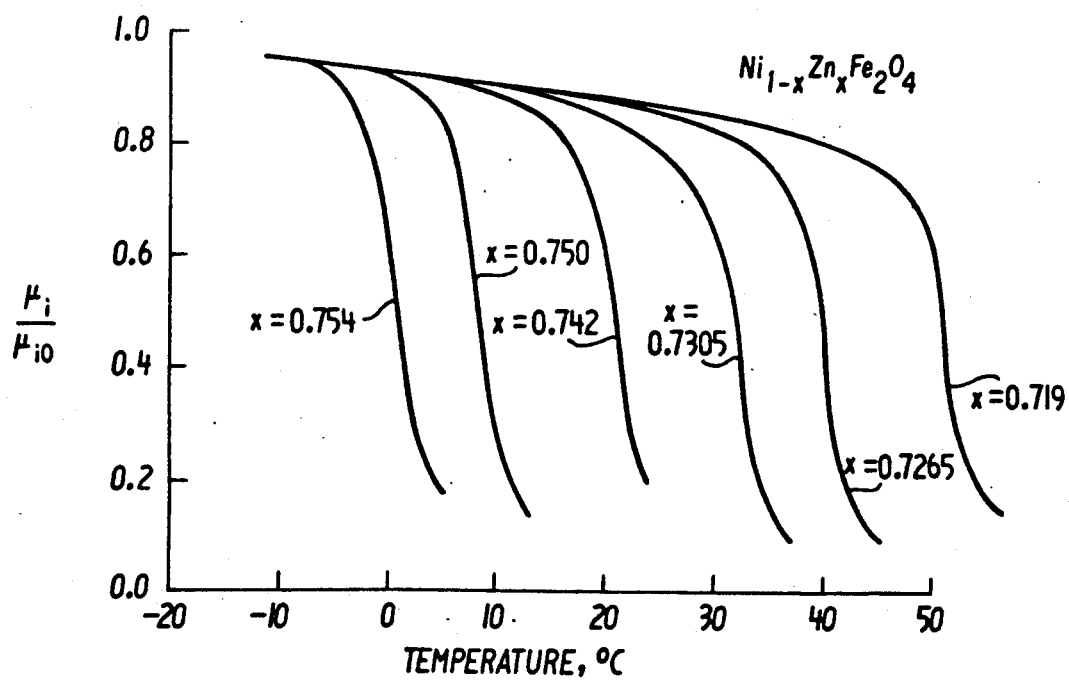
FIG. 2 is a graph showing the normalized initial permeability versus temperature curves for nickel zinc ferrite as a function of composition.

As an example of the invention, FIG. 1 shows the dependence of the critical temperature of a spinel ferrite, $Ni_{1-x}Zn_xFe_2O_4$, on its chemical composition. It is to be noted from the graph that the dependence is linear and that the critical temperature increases with increased nickel concentration. In this example, the starting materials were $NiO, Fe_2O_3$ and $ZnO$ powders of the correct proportions to obtain the desired composition. After intimate mixing of the starting materials, they were pressed in the desired form and sintered at 1200° C. for eight hours. However, the permeability of these materials was not constant at temperatures below their transitions to their critical temperatures as disclosed in the normalized initial permeability ($\mu_i/\mu_{io}$) versus temperature curves for different compositions of zinc nickel ferrites with transtition temperatures roughly 10° C. apart.

The anisotropic energy of magnetic materials is, in accordance with the invention, altered by the introduction of impurities or imperfections into same until the temperature dependence of the anisotropic energy closely matches the temperature dependence of the magnetostatic energy. In a preferred embodiment, impurities were introduced into the NiZn ferrite by the addition of extra ZnO to the starting materials. It was thus found that 10 percent by weight increase of the ZnO above the amount required for exact stoichiometry reduces the maximum value of the initial permeability and makes it temperature independent up to the critical temperature.

It was found as a practical matter, with the starting materials reagent quality pure and the weight ratios accurate to one part in a million, the critical temperature could be predetermined to about 2° C. For a more accurate determination of the critical temperature, the starting materials were diffused with additional metal ions by a process termed fluid "doping." It was found that doping could be advantageously accomplished through the use of metal ions in liquid form such as soluble salt of the metal. The preferred doping agent was a metallic compound of the desired metal ion such as for example for nickel doping, nickel acetate. The metal salt is dissolved in a proper solvent in the desired concentration ratio. For the example of nickel acetate the solvent comprises distilled water with nickel acetate dissolved therein in a ratio of about 1 gram per 100 cubic centimeters. Other solvents such as alcohols may be used so long as they can be eventually eliminated from the material. The starting material as disclosed above having been intimately mixed, is wetted in such form with the solution. Thereafter with the solvent evaporated, the starting material has the metallic molecules uniformly distributed therein. The starting material, so modified, is then pressed into the desired shape for the magnetic structure and preheated at a temperature sufficient to decompose the metallic molecule into metal atoms and gases. In a particular example, the nickel acetate molecule is decomposed at 300° C. for one hour into nickel atoms, carbon dioxide and water.

Thereafter, final sintering at 1200° C. for eight hours followed by slow cooling completes the material preparation for this example. The sintering temperature is about 50°-100° C. below the melting point of the ferrite involved. For the example, this is in a range of 1150°-1250° C. with the greater the amount of zinc, the lower the temperature. It is desired to being the sintering temperature as close to the melting point as possible without actually melting the substance. However, because industrial furnaces may vary as much as from 35° C. from their set temperatures, it is advisable that the sintering be at least 50° C. below the melting point of the ferrite. The resulting material is about 98-99 percent of its theoretical density.

Figure 3:
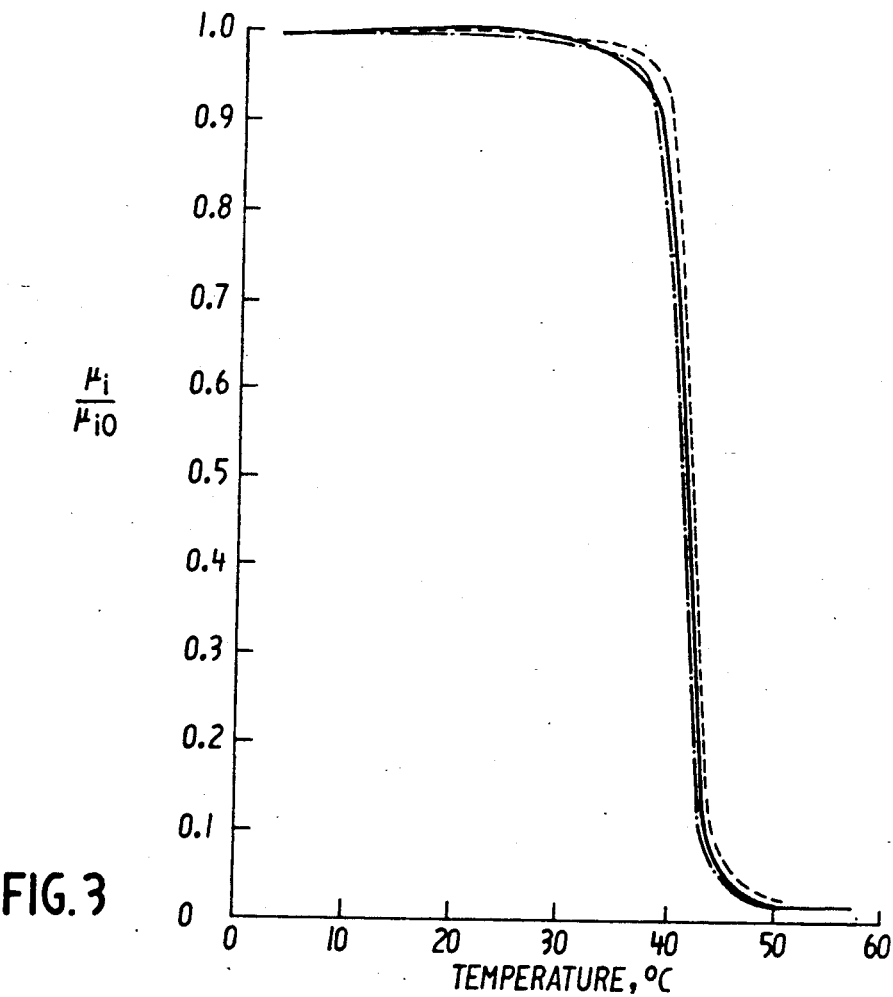
FIG. 3 is a representation of the influence of nickel doping on the normalized initial permeability ($\mu_i/\mu_{io}$) versus temperature curves for the nickel zinc ferrite in accordance with the invention.
Figure 4:
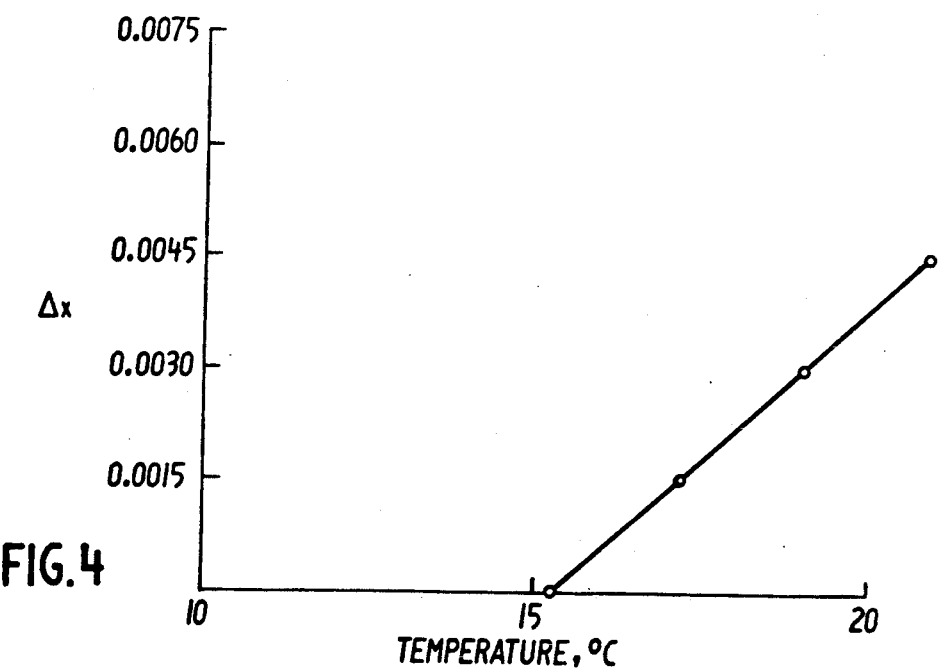
FIG. 4 shows the linear relationship between transition temperature and the change in concentration of the nickel in the ferrite as introduced by the solution used for liquid nickel ion doping.

FIG. 3 illustrates the abrupt permeability versus temperature curves for three small toroidal cores with the transition temperatures set about 1° C. apart by the addition of nickel ions in the doping process which increases the critical temperature in a linear manner up to 10° C. from the critical temperature of the starting substance. In the Figure, the initial permeability is normalized $\mu_i/\mu_{io}$. The results shown in FIG. 3 were taken from three ferrite cores produced in accordance with the invention each core being two millimeters in diameter and the measurement was made by means of a mutual coupling between a primary and secondary winding at 50 kHz. The linear relation between transition, temperatures and concentrations of solutions used for the nickel ion doping is shown in FIG. 4 for four ferrite samples having permeability versus temperature curves about 2° C. apart. The formula for such samples may be expressed $Ni_{1-x+b}Zn_{x+a}Fe_2O_4$. where "x" is 0.7455, "a" is a number from 0.05 to 0.2, (actually 0.1) as necessary to provide a substantially constant permeability of the material relative to the temperature up to the transition temperature and "b" is a number in the range of $10^{-1}$ to $10^{-6}$ as represented by $\Delta^x$ in FIG. 4. Another example of magnetic materials in accordance with the invention comprises the composition $Fe_{3-x}Mn_xGe$ where x is a number between zero and 3. This example exhibits a continuous linear change of transition temperature relative to x from 365° C. where x equals 0 to minus 245° C. where x equals 3. In this example, the starting materials are Fe, Mn and Ge in the correct proportions to obtain the desired composition. Another example is $Fe_{5-x}Mn_xGe_3$ which has a continuous linear change of transition temperature as a function of x between 30° C. where x equals 5 and 115° C. where x equals 0. Still further compositions, $Co_{1-x}Fe_x$ or $Fe_{1-x}Ni_x$ exhibit a continuous change in transition temperature as the function of x from 1,125° C. to 355° C. In each of the foregoing examples, the starting materials, having been thoroughly mixed, are arc-melted in a neutral atmosphere such as argon and immediately quenched to room temperature. This produces voids and thus imperfections to disrupt symmetry of the crystaline structure of the substance and to increase the anisotrophy energy. These imperfections in the material are subsequently controlled by annealing the material at a desired temperature for the necessary length of time. In this connection, referring to FIG. 5, the abrupt permeability versus temperature curves for small cylindrical samples prepared from the material, manganese geranium ($Mn_5Ge_3$) by pulverizing and pressing with an organic binder are illustrated. The curve which follows the circular representations on the graph of FIG. 5 was for a cylinder prepared from a sample of $Mn_5Ge_3$ which was arc-melted, quenched to room temperature, sifted through a number 230 mesh after having been powdered, and thereafter formed of particles bound with butvar. The cylindrical pellet which was formed by pressing had a diameter of 0.379 inches and a length of 0.573 inches. Its weight was 5.71 grams. The test which produced the graph shown in FIG. 5 were performed in a solenoid two inches in length with 650 turns wound on an 11 mm quartz tubing. The pellet was annealled at 900° C. for 24 hours. For the curve defined by the diamond shaped representations in FIG. 5, a similar sample of $Mn_5Ge_5$ was arc-melted, quenched at room temperatures and annealed in a quartz tubing at 950° C. for 24 hours. Its diameter was 0.377 and its length 0.382 inches. For both curves, the abrupt permeability versus temperature relationship is apparent.

In order to obtain the transition temperature with the desired pre-selected accuracy, after melting, the material is pulverized and wetted with a solution comprising a soluble salt of the metals, iron, manganese or nickel, in the desired concentration. Thereafter, the solvent is evaporated by heating and the metallic salt is decomposed in a reducing atmosphere such as hydrogen or carbon monoxide so that the dopant metal atoms are uniformly distributed throughout the material. Thereafter, the material is pressed into the desired shape, sintered in a neutral atmosphere, annealed at the desired temperature and thereafter slowly cooled.

In the event that eddy-current losses are important for the particular application, the sintered material may be again pulverized and pressed into the desired shape with an insulating organic binder such as polyvinyl alcohol or polyvinyl butyral.

Referring now to FIG. 6, an oscillator 10 is the source of an electromagnetic time-varying signal. A toroidal type inductor 12 composed of material in accordance with the invention is in series in the circuit from oscillator 10 with a light bulb 14—a preferred detection device. With the magnetic material of inductor 12 below its critical temperature, its permeability and inductance are high and, accordingly, the impedance of the inductor is also high making the voltage differential across the bulb 14 low which is therefore in an off condition. With the temperature of the magnetic material exceeding the critical temperature, the permeability, inductance and impedance are all low whereby the necessary voltage is placed across bulb 14 which is thereby placed in a lighted or on condition. It will be appreciated that the toroidal inductor 12 operates as a magnetic switch without any moving parts. It will be noted in FIG. 6 that the oscillator 10 also has its output across a toroidal transformer 15. A light bulb 16 is in series with the primary winding of transformer 15 and operates in a manner similar to that of bulb 14 in series with inductor 12, that is, bulb 16 is in an on condition when the temperature of the transformer is above the critical point and is in an off position when the temperature is below it. On the other hand, bulb 17 is in series with the secondary winding of transformer 15. At temperatures below the critical point, the permeability of the magnetic material in transformer 15 is high and therefore the coupling (or mutual inductance) between the primary and secondary winding is strong. The induced voltage in the secondary winding is thus high and light bulb 17 is in an on condition. However, when the temperature of the magnetic material of transformer 15 exceeds the critical point, the permeability, the coupling and secondary voltage are low and bulb 17 is in an off condition. It will be appreciated that this functionally represents a thermally activated single-pole, double throw magnetic switch without moving parts.

Referring to FIG. 7, a use of the invention as a digital magnetic transducer is illustrated. Here, the signal propagating apparatus comprises a set of magnetic cores 20, 21 22 and 23 produced in accordance with the invention to have different critical temperatures spaced at given intervals. Each is wound with primary and secondary coils. The cores are preferably toroidal in shape and the primary coils are connected together in series and driven by a pulse driver 24. It will be appreciated that magnetic cores 20, 21 and 23 are used as linear pulse transformers with the output voltages in the secondary coils being linearly proportional to the permeability of the magnetic material among other things. Should the coils be driven into saturation, the output voltage becomes non-linear and proportional to the magnetization instead of the permeability whereupon a different and undesired temperature dependence results.

The secondary windings of cores 20, 21, 22 and 23 are connected to a pulse detector 25 which preferably is a threshold detector. Pulse detector 25 detects pulses from the output of those cores 20, 21, 22 and 23 which are below their critical temperatures and does not detect output pulses from such cores which are above their critical temperatures. In this way, pulse detector 25 determines the range of temperatures of the magnetic cores. The output of pulse detector 25 may be stored in a shift register 26 from whence the information can be received on command. Thus, the register 26 may convert the parallel output of cores 20, 21, 22 and 23 and pulse detector 25 into a series output and shift same out on request.

Referring to FIG. 8, the driving current through the primaries of cores 20, 21, 22 and 23 is a triangular wave in time. Thus, inasmuch as such cores are used as linear pulse transformers, they act in accordance with known electrical induction laws as differentiators. The output of the secondary coils is therefore the time derivative of the drive current and is a square wave in time. Such a preferred configuration of the drive eliminates the need for integration or additional pulse shaping circuitry in pulse detector 25.

As a preferred arrangement, pulse detector 25 in FIG. 7 comprises digital comparators—one for each core output—which compare the amplitude of the output square wave from cores 20, 21, 22 and 23 to a reference voltage. Preferably, such reference voltage is derived from the primary current drive by differentiating it in time. Such differentiation may be performed by an air core transformer or other means such as a RC network. In such manner, the ratio of the output voltage from cores 20, 21, 22 and 23 to the reference voltage remains independent of the slope, frequency or exact shape of the drive current.

A magnetic thermometer produced in accordance with the invention gives accurate results from below $-20°$ C. to above $700°$ C. An important aspect of the invention lies in the accuracy obtained and its adaptability to the digital computer art. Magnetic cores produced in accordance with the invention have been found to have extremely high reliability and reproducibility. They are shock and radiation insensitive and virtually indestructible.

A further embodiment of the invention is an apparatus which incorporates the magnetic material, which is produced in accordance with the invention, in a phase-shifting network. With a frequency varying signal below 100 Mhz, the apparatus is constructed of discrete elements with a magnetic structure being closed-flux type inductors or transformers. The self-inductance or mutual-inductance of such inductors or transformers changes drastically at the critical temperature and is therefore adaptable for utilization, in conjunction with resistive or capacitance elements well known in the art, to change drastically the phase of the propagating signal. In a preferred arrangement, a phase-sensitive detector is utilized as a responsive means and the output of the phase detector drastically and discontinously is altered at the critical temperature.

With frequencies above 100 Mhz, the signal propagating apparatus is of the waveguide type and the magnetic structure of proper geometry is appropriately located inside the wave propagating guide. Through this means, the phase of the propagating signal is again drastically altered at the critical temperature due to the change in permeability which takes place in the magnetic structure. A phase-sensitive responsive component such as a micro-wave balanced bridge is preferably utilized as a responsive means with the output of the bridge being drastically and discontinuously altered at the critical temperature.

If desired, the type of varying signal may be a pulse or a series of pulses of a particular shape such as, for example, a square shape. When such pulse or pulses travel along the magnetic structure, the shape of the pulse is changed if the magnetic material is below its critical temperature. However, the shape remains unchanged with the magnetic material above the critical temperature. The reason for this is that the velocity of propagation of the pulse through the magnetic material is a function of its frequency. Thus, a shape detector, preferably a correlator is utilized as the responsive means and the apparatus operates as a temperature responsive device having an output which discontinuously alters at the critical temperature.

All temperatures unless otherwise specified, are in centigrade. As used in the claims, the term "imperfections" is intended to include voids, impurities, and distortions which disrupt the symmetry of the crystaline structure of the materials involved.

Having described my invention, what I desire to secure by Letters Patent of the United States is:

1. In a method of producing a composition which in its crystalline state is magnetic and has a substantially constant permeability at temperatures up to its transition temperature and an abrupt reduction in permeability at a predetermined transition temperature for use in detecting with a high degree of accuracy whether the ambient temperature is above or below a predetermined transition temperature of the composition in said crystalline state, the process of producing a magnetic material which has constant permeability at temperatures within about 0.1 degrees centrigrade of a known transition temperature that closely approximates said predetermined transition temperature, said process including a step which performs the function of equalizing the temperature dependency of said material's magnetically anisotrophy with that of its magnetostatic energy when it is in its crystalline state.

2. A method in accordance with claim 1, wherein said impurities or imperfections consist of atoms of an element which diplace some of the atoms of said metal in said resulting crystalline state and have a large atomic diameter relative to said metal atoms, said second metal atoms being introduced into said substance by being uniformly mixed therewith.

3. A method in accordance with claim 2, wherein said transition temperature, obtainable by mixing starting materials reagent quality pure and in weight ratios accurate to one part per million, could be closely approximated to about plus or minus 2° C. of said transition temperature and is further controlled to obtain an accuracy within 0.1° C. of said transition temperature by uniformly diffusing therein a predetermined amount of a soluble salt of iron, manganese, or nickel which is not so great as to alter the circumstance that the composition in its magnetic state has a substantially constant permeability at temperatures up to its transition temperature and an abrupt reduction in permeability at such transition temperature.

4. A method in accordance with claim 2, wherein said metal is cobalt and said second metal is iron.

5. A method in accordance with claim 3, wherein said metal is iron and said second metal is nickel.

6. A method in accordance with claim 3, wherein said metal is manganese and said second metal is germanium.

7. A method of producing a magnetic article having a desired transition temperature within an accuracy of at least 0.1° C. which comprises the steps of:

(1) providing a homogeneous mixture in a powdered form which in its crystalline state is magnetic, the mixture conforming to the formula $Fe_{(n-x)}Mn_xGe$ as necessary to provide a predetermined transition temperature range of said homogeneous mixture in its crystalline state which is within 2° C. of said desired transition temperature and wherein "n" is 3 or 5 and "x" is less than "n" and greater than 0;

(2) introducing imperfections into said mixture homogeneously in the form of added Mn in sufficient amounts as necessary to provide that the magnetic permeability of the resulting mixture in its crystalline state remains substantially constant with changes in temperature up to said predetermined transition temperature, the mixture with said added Mn conforming to the formula $Fe_{(n-x)}Mn_{(x+a)}Ge$ where "a" is a number between 0.05 and 0.2;

(3) introducing by liquid diffusion into the resulting mixture from step (2) above iron ions in sufficient quantities to provide the mixture resulting therefrom with a transition temperature in its crystalline state which is within at least 0.1° C. of said desired transition temperature and has a magnetic permeability which remains substantially constant with changes of temperature up to its transition temperature, said last resulting mixture conforming to the formula $Fe_{(n-x+b)}Mn_{(x+a)}Ge$ where "b" is a number in the range of $10^{-1}$ to $10^{-6}$;

(4) forming the last resulting mixture into the desired shape of said article and preheating it to a temperature sufficient to decompose all constituents added by the liquid diffusion step (3) except the iron atoms; and (5) sintering the aforesaid shaped article at a temperature less than the melting point of the mixture by not more than 100° C., and thereafter annealing and slowing cooling said article to convert it into an article of magnetic crystalline structure having the desired transition temperature with accuracy within 0.1° C. or better.

8. A method of making a specifically structured ferromagnetic composition which has substantially constant permeability at temperatures up to its transition temperature and an abrupt reduction in its permeability at a predetermined transition temperature which is employed to detect with a high degree of accuracy whether the composition is above or below said predetermined transition temperature, the method including the step of producing a magnetic material which in its specifically structured crystalline state will have a known constant transition temperature that approximates within a plus or minus 2° C. said predetermined transition temperature, said step including the introduction homogeneously into said material mettalic atoms which sufficiently distort said material when in its said crystalline state so that the temperature dependency of its anistropic energy is the same as that of its magnetostatic energy.

9. A method according to claim 1, wherein said step comprises introducing homogeneously into a substrate which includes a first metal selected from one of the groups consisting of the iron group, atomic numbers 22-30, the palladium group, atomic numbers 40-48, the platinum group, atomic numbers 72-80, or lithium, atomic number 3, wherein said substance has a crystalline state in which it is magnetic, sufficient impurities or imperfections comprising a second metal selected from the group consisting of zinc, titanium, zirconium, cadmium, yttrium and any of the aforesaid metals of the iron, palladium, and platinum groups and lithium, so that the temperature dependency of the magnetocrystalline anisotrophy and that of the magnetostatic energy of the resulting material when it is in its crystalline state are equalized.

10. A method of making an intermediate material to be used in producing ferromagnetic crystalline compositions capable of detecting within 0.1° C. selected desired temperatures by abrupt reductions occurring in the corresponding initial magnetic permeabilities of such magnetic crystalline compositions at said selected temperatures, said intermediate material consisting essentially of a material which in its crystalline state is magnetic and has a constant transition temperature that is within plus or minus 2° C. of at least one of said selected desired temperatures, the method comprising a step of performing the function of equalizing the temperature dependency of said material's anisotropic energy and that of its magnetostatic energy when in said crystalline state.

11. A method in accordance with claim 10, wherein said step comprises introducing homogeneously into said material metallic atoms which sufficiently distort the crystalline structure of said material when in said crystalline state so that the temperature dependency of its anisotropic energy is the same as that of its magnetostatic energy.

* * * * *